United States Patent [19]

Dupuy

[11] Patent Number: 5,519,968
[45] Date of Patent: May 28, 1996

[54] VEHICLE WINDOW SEALING STRIP WITH INTEGRAL DOWNWARD RETAINING FLANGE

[75] Inventor: Ronald E. Dupuy, Wabash, Ind.

[73] Assignee: GenCorp Inc., Fairlawn, Ohio

[21] Appl. No.: 501,915

[22] Filed: Jul. 13, 1995

[51] Int. Cl.⁶ .................................. E06B 7/16; B60J 1/16
[52] U.S. Cl. ........................... 49/489.1; 49/377; 49/492.1
[58] Field of Search .............................. 49/489.1, 492.1, 49/377, 490.1

[56] References Cited

U.S. PATENT DOCUMENTS

| | | |
|---|---|---|
| 2,184,186 | 12/1939 | Geyer . |
| 2,719,343 | 10/1955 | Harris . |
| 2,787,033 | 4/1957 | Peckham et al. . |
| 2,902,732 | 9/1959 | Beck et al. . |
| 2,909,819 | 10/1959 | Fernberg . |
| 3,139,784 | 7/1964 | Moorman . |
| 3,167,826 | 2/1965 | Watzl et al. . |
| 3,218,680 | 11/1965 | Deal et al. . |
| 3,411,245 | 11/1968 | Sturtevant . |
| 5,085,005 | 2/1992 | Yasukawa et al. . |
| 5,207,027 | 5/1993 | Larsen ..................................... 49/377 X |
| 5,267,415 | 12/1993 | Vaughan ............................. 49/489.1 X |
| 5,297,360 | 3/1994 | Besore et al. ....................... 49/492.1 X |
| 5,433,038 | 7/1995 | Dupuy ................................. 49/492.1 X |

Primary Examiner—Philip C. Kannan
Attorney, Agent, or Firm—Robert F. Rywalski; Daniel J. Hudak

[57] ABSTRACT

A belt-line weather sealing strip for sealing the opening between a vehicle window housing and a slidable window pane includes an elongate, relatively rigid, thermoplastic base having at least one integrally attached thermoplastic resilient fastening means which extends downwardly and has a longitudinal slot which is capable of engaging an aperture edge portion of the housing forming the belt-line portion of the window opening. The sealing strip also includes a relatively flexible, elastomeric sealing element joined to the thermoplastic base. The fastening means is inserted downwardly through a vehicle window housing aperture and then moved horizontally to effect a secure engagement of the sealing strip with the housing.

16 Claims, 4 Drawing Sheets

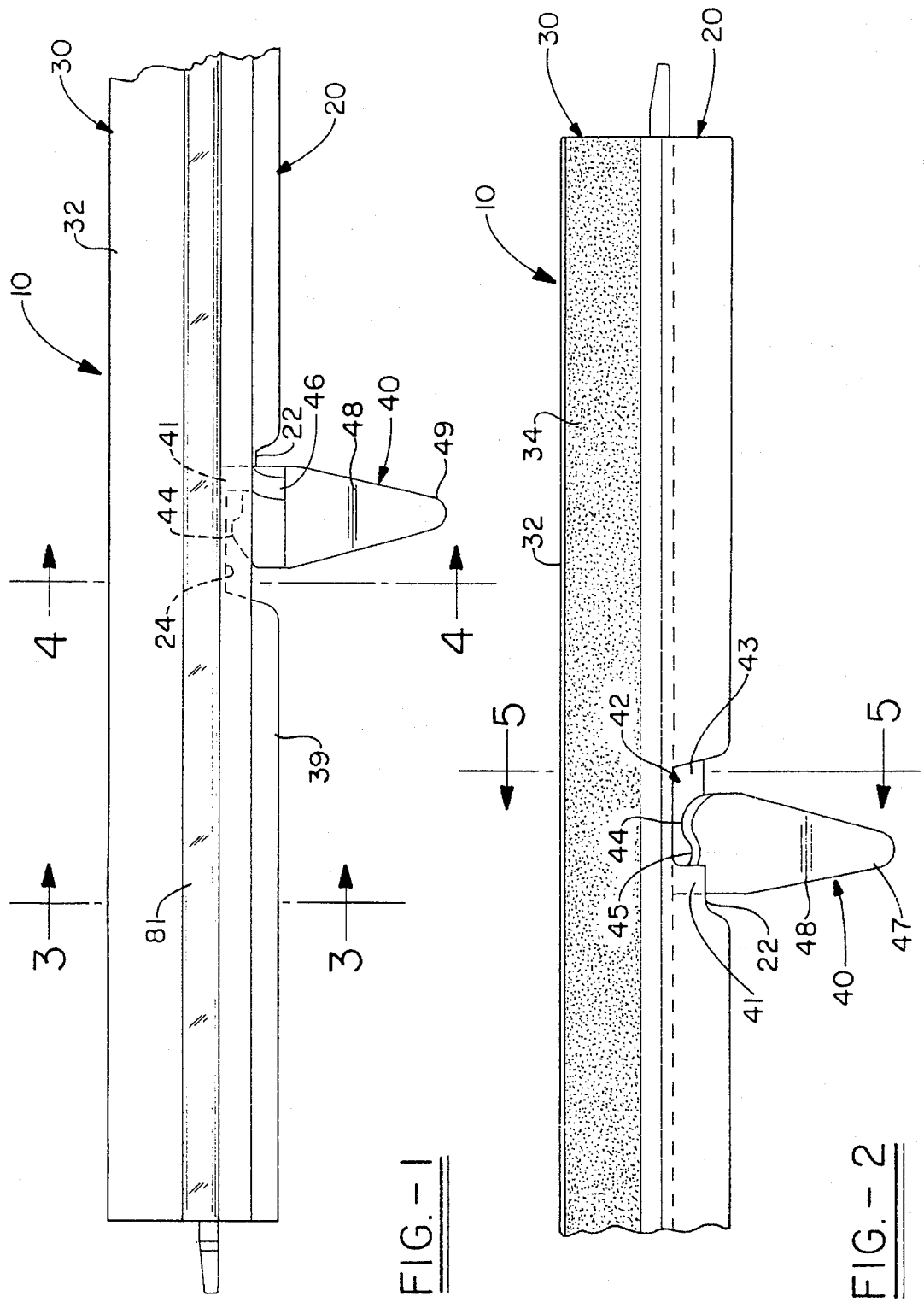

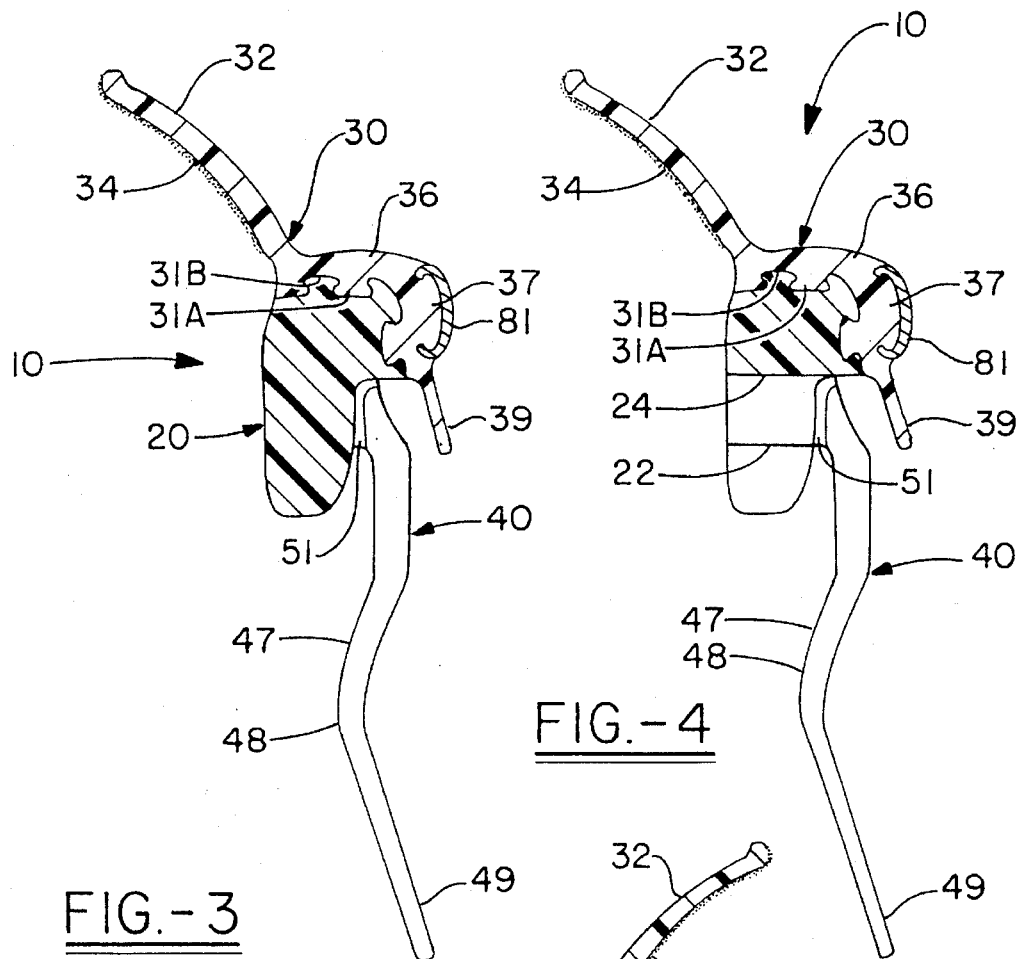
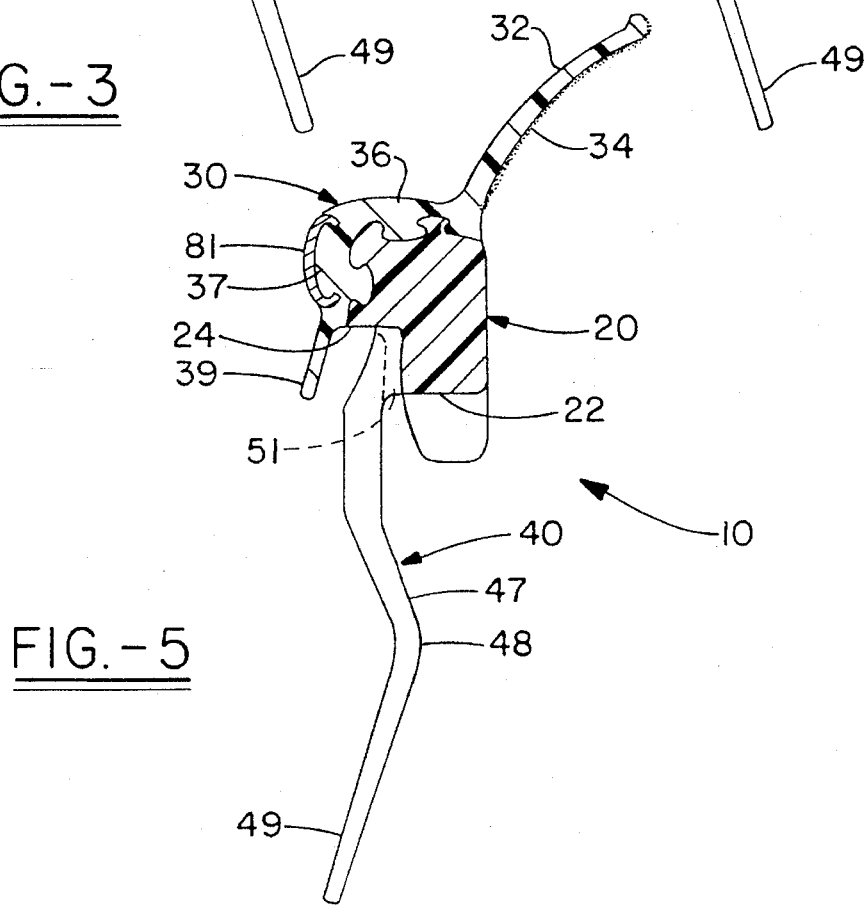

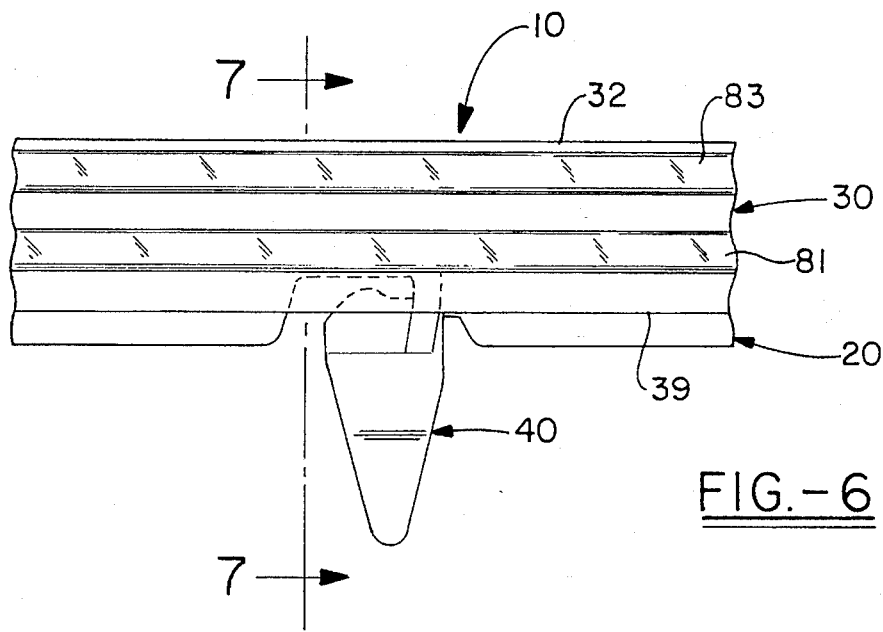
FIG.-6
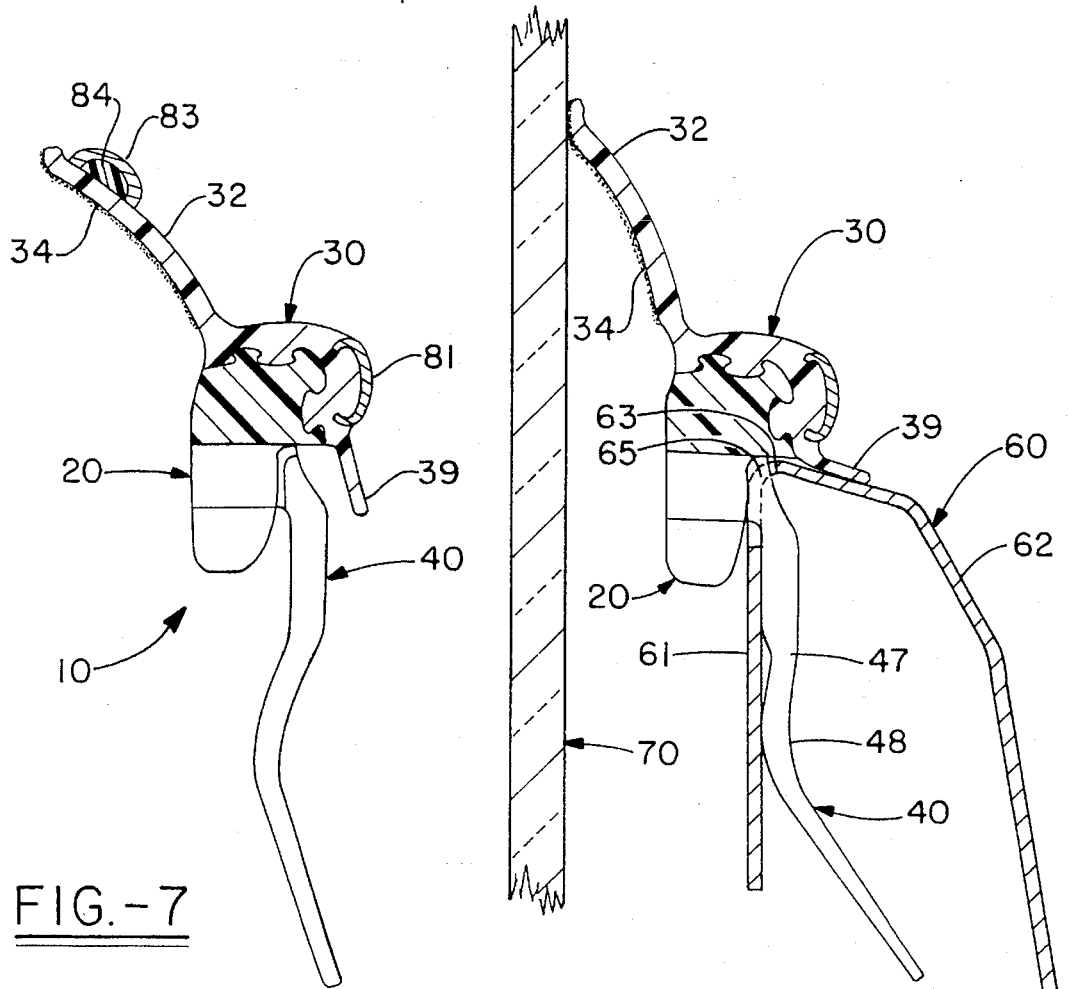
FIG.-7
FIG.-8

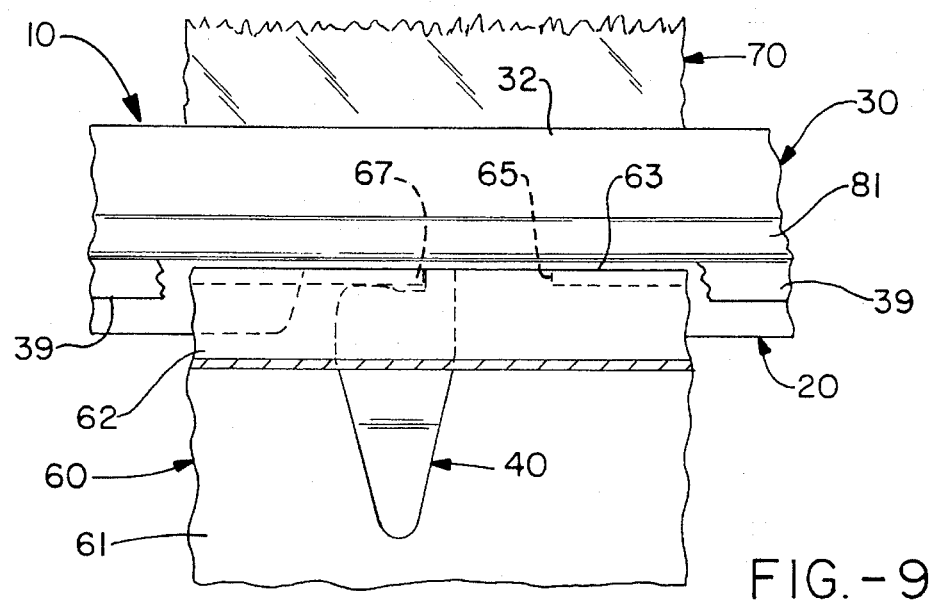
FIG.-9
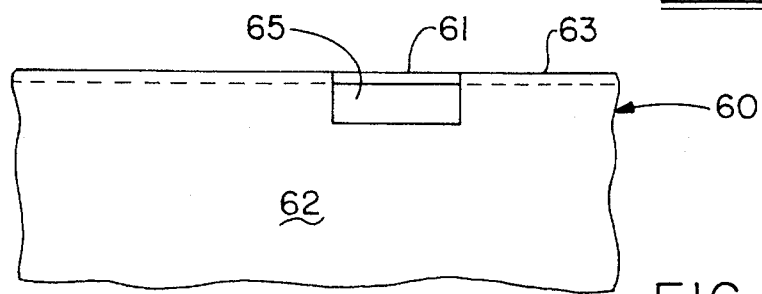
FIG.-10
FIG.-11
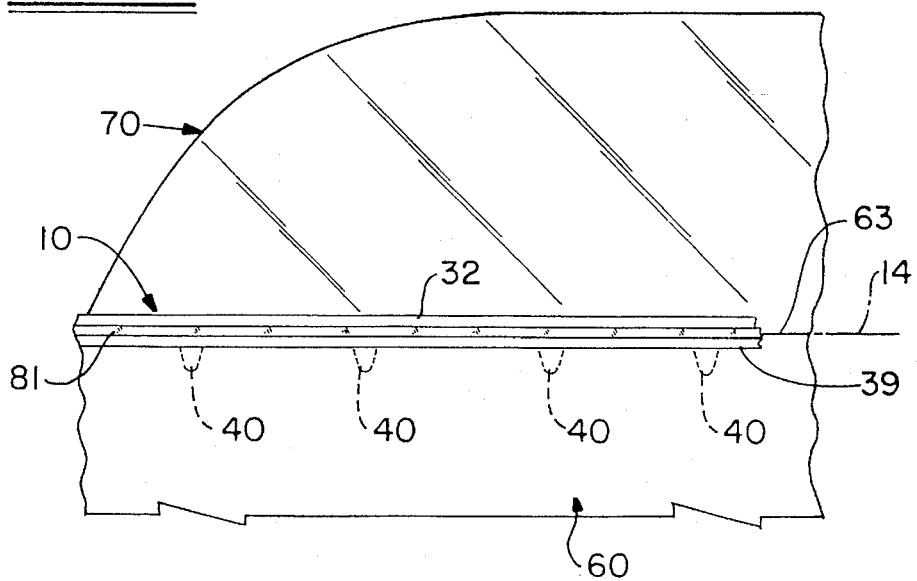

5,519,968

VEHICLE WINDOW SEALING STRIP WITH INTEGRAL DOWNWARD RETAINING FLANGE

FIELD OF THE INVENTION

The present invention relates to a weather sealing strip having a thermoplastic base and a downwardly dependent fastening means for securing the strip to the housing of a vehicle window in the vicinity of the belt line. The weather strip serves to seal the area between a window pane and the vehicle window housing.

BACKGROUND OF THE INVENTION

Prior art weather sealing strips have generally been extruded and separate retainer clips have been used for attaching the extruded weather sealing strips to the periphery of a vehicle window opening. These retaining clips are usually designed so that they can be mounted onto the periphery of the window opening by inserting a portion of the retaining clip into an aperture or slot pierced into the sheet metal defining the window opening. The prior art retainer clips are usually made of a springy, resilient material having separate deformable means for securely retaining a weather sealing strip and for locking the retainer clips into the openings provided in the sheet metal defining the window opening. Conventional extruded sealing strips which are attached to the window opening with separate retainer clips have the disadvantages of requiring the manufacturing, procurement, inventorying and assembly of a plurality of separate components. Another disadvantage with extruded sealing strips is that they generally require additional detail such as end caps which are generally used to cover the exposed ends of an extruded sealing strip to provide for better aesthetics.

SUMMARY OF THE INVENTION

An aspect of the present invention is to provide a one-piece functional and decorative weather sealing strip having integrally formed fastening means to simplify fabrication and mounting of the strip to a vehicle window.

Another important aspect of the invention is to provide a weather sealing strip having integral fastening means capable of being easily inserted into an aperture of a vehicle window housing and subsequently, upon longitudinal movement in one direction, engages the window housing and is securely fastened with a clip or retaining flange thereto so that the weather strip cannot easily be extracted from the window opening by exerting forces on the strip in a direction outward or inward of the vehicle window opening. Another aspect is that the weather strip can be removed from the window housing by simply unfastening the clip and sliding the strip in the other direction along its longitudinal axis so as to disengage the fastening means from the aperture edge portion of the window housing.

The foregoing and other aspects and advantages of the invention are achieved by a weather sealing strip having a sealing element as well as one or more integrally formed thermoplastic downward extending retaining flanges adapted for insertion into apertures provided in a vehicle window housing. The resilient downward projecting retaining flanges include fastening means such as slots for engaging the housing adjacent to the aperture to securely hold the strip in abutment therewith. More specifically, the retaining flange contains a slot located in the vicinity of the joinder between the flange and the thermoplastic weather strip base so that the strip can be slid in the direction of its longitudinal axis whereby the flange slot engages the window housing, i.e. the vehicle sheet metal or plastic. The weather seal strip desirably is made by coextruding two different types of rubber material and then subsequently forming a thermoplastic base and retaining flange in a thermoforming operation such as injection molding.

BRIEF DESCRIPTION OF THE DRAWINGS

FIG. 1 is a front view of a weather sealing strip in accordance with the invention;

FIG. 2 is a rear view of the weather sealing strip of FIG. 1;

FIG. 3 is a cross-sectional view of the weather sealing strip taken on line 3—3 of FIG. 1;

FIG. 4 is a cross-sectional view of the weather sealing strip taken on line 4—4 of FIG. 1;

FIG. 5 is a cross-sectional view of the weather sealing strip taken on line 5—5 of FIG. 2;

FIG. 6 is a segmented front view of an alternative decorative embodiment of the weather sealing strip of the present invention;

FIG. 7 is a cross-sectional view taken on line 7—7 of FIG. 6;

FIG. 8 is a cross-sectional view showing the weather sealing strip installed on the window housing of a vehicle with the sealing element contacting a window and housing;

FIG. 9 is a front cross sectional view showing the downward retaining flange located within the window the downward extending retaining flange of the weather sealing strip installed within an aperture of the window housing;

FIG. 10 is a top view of the window housing and aperture of the present invention; and FIG. 11 is a side view of a vehicle door showing the location of the weather sealing strip of the present invention.

DETAILED DESCRIPTION OF THE INVENTION

The weather seal strip of the invention, generally indicated by the numeral 10, contains a base portion generally indicated by the number 20 which is usually molded, and a seal element generally indicated by the number 30 which is usually extruded. The attachment of the seal to the base is accomplished through bonding as well as through physical interlocking.

The base portion is made of a generally semi-rigid or rigid thermoplastic. Suitable thermoplastics include polyvinyl chloride, various polyolefins derived from olefins having from 2 to 5 carbon atoms such as polyethylene, polypropylene, and the like, as well as other thermoplastics which have sufficient rigidity to form a tough, generally stiff, non-bendable base. The thermoplastic can desirably be reinforced by fibers such as glass, carbon, etc. The base portion generally has a flexural modulus of from about 300,000 to about 900,000, and desirably from about 500,000 to about 750,000 psi. The elongation is from about 1 to about 30 percent and desirably from about 3 to about 15 percent.

As apparent from FIG. 11, weather seal strip 10 generally extends the entire length of the outer or exterior belt line area, generally indicated by the number 14 of a vehicle window opening. The window opening is the area between window 70 and a window housing generally indicated by the number 60, see FIG. 8. The base of the weather strip has a plurality of integral fastening means such as downward extending clip or retaining flange 40 which can generally be of any shape, e.g., triangular, so long as it fits through a window housing aperture. The joinder area of the flange to the base is at base recess 22, and generally is along only a limited of finite extent of the longitudinal flange length, e.g., less than 70 percent, 50 percent, 40 percent, 30 percent, or 20 percent, see FIG. 2. As shown in FIGS. 3–5, 7 and 8, the entire flange is also laterally offset, e.g., outwardly, from the base with the offset being located above the bottom of the base. The flanges which are whole or undivided, that is, not bifurcated, split, etc., are generally made of the same type of thermoplastic material as base 20, but are thinner, and hence resilient.

As shown in FIGS. 1, 2, 6, and 9, clip or flange 40 generally has a longitudinal slot 42 which extends a finite or limited longitudinal distance of the flange, e.g., a major distance of at least 50 percent, 60 percent, 70 percent, or 80 percent. The slot also laterally traverses or extends through the flange and the base. The base also has an inverted valley 24 as best shown in FIGS. 1 and 4, which generally extends longitudinally the entire length of the weather seal and forms the upper horizontal straight surface of the slot. Slot 42 preferably has a wide mouth 43 and a narrow neck 44 to provide a tight, secure engagement with the sheet material adjacent to one side of the aperture of the window housing. The slot generally terminates with an enlarged recess area 45 which facilitates the ease of installation of the weather seal. Neck 44 thus serves as an engagement or fastening area of the retaining flange with the window housing. Reinforcing rib 46 which resides in the joinder area provides additional strength and support to prevent breakage or separation of clip or flange 40 from base 20. Flange 40 also has a lower or leg portion 47 which curves slightly towards the interior side of the sealing strip, see FIGS. 3–5, 7 and 8. When inserted within the vehicle window housing, leg 47 with inward knee portion 48 biases the weather sealing strip into a generally vertical position.

Attached to thermoplastic base portion 20 is rubber seal element 30 as shown in the various drawings. The seal element through body portion 36 is both bonded and mechanically attached to the base through one or more tabs 31A and recesses 31B which engage and interlock with corresponding recess and tab portions of the thermoplastic base. Inasmuch as both base 20 and seal element body 36 are made of relative hard materials, a good mechanical bond is obtained.

Seal element 30 is designed to provide for a slidable sealing engagement with an outer surface of window 70 as it is raised or lowered. Lip 32 of the seal element is generally upwardly and inwardly directed to the inside of the vehicle. A low friction material 34 is contained on the inward side of the seal element and can be any low frictional coating material such as a flock, low friction polymers such as teflon or polypropylene, and the like. Seal element 30 also has a skirt 39 which forms a seal with window housing 60, see FIG. 8. Thus, the seal element forms a seal between glass window and the window housing of a vehicle body.

Although seal element 30 can be made of a single elastomeric type of material, desirably it is made of rubbers of two different hardnesses or durometers as by coextrusion. Thus, lip portion 32 and skirt 39 are generally made of a softer rubber, for example from about 55 to 80 Shore A durometer with from about 60 to about 70 durometer being preferred, whereas body portion 36 is made of a harder rubber such as about 81 to about 100 Shore A durometer with from about 85 to about 95 being preferred. Suitable elastomers which are relatively flexible, low durometer, include ethylene-propylene-diene terpolymer (EPDM), ethylene-propylene copolymer (EPM), styrene-butadiene rubber (SBR), and the like, whereas body portion 36 having a high durometer can be made of the same type formulated to a harder rubber.

As seen in FIG. 8 and FIG. 10, a vehicle window housing 60 such as the belt line portion of a vehicle door generally is formed of a metal or a thermoset plastic. The window housing generally has a vertical leg 61, an outward panel 62, and a narrow, substantially horizontal surface 63 at the top of the inverted U-shaped channel which generally defines the lower periphery of the window opening. Along the length of the substantially horizontal surface 63 are provided a plurality of generally elongated rectangular openings or apertures 65, see FIG. 10. The apertures 65 are sized and spaced apart from each other so that each of the plurality of downward extending clips or retainer flanges 40 of weather strip 10 can be inserted into an aperture. The long dimensioned sides of the generally rectangular slots are typically substantially parallel to the longitudinal direction of the sealing strip. After downward insertion, sealing strip 10 is fastened to the exterior belt line area of the window opening by forcing or sliding the integral flanges in the direction of the strip longitudinal axis, that is in a horizontal direction. As the sealing strip is initially and longitudinally pushed into its installed position, it is forced slightly downward as neck 44 of the retaining flange engages the aperture edge portion 67, thereby forcing resilient, but generally stiff clip or flange 40 slightly downward and causing a secure engagement between weather sealing strip 10 and the window housing 60. Continued longitudinal movement of the slot into the aperture edge portion provides further engagement between the retaining flange and the window housing until flange recess portion 45 generally engages the end of aperture 65. Fastening of the sealing strip of the invention to a window opening is thus accomplished by a simple, two-step process of inserting retaining flanges 40 in the corresponding apertures 65 of the window metal housing and then pushing the sealing strip longitudinally. The sealing strip is held in a longitudinal position by an anchor on the end of the strip which fixedly but removably is attached to a window housing, e.g., a vertical housing.

As noted above and best seen in FIGS. 3–5, 7 and 8, retaining flange 40 is laterally and outwardly offset from body portion 20 by connecting rib 51. This offset permits flange 40 to be inserted into window housing aperture 65 so that base 20 in association with valley 24 engages or abuts one side of generally vertical housing leg 61 whereas flange leg 47, as noted above, resiliently engages the other side of the housing leg. Another aspect of the invention is that upward recess 22 of base 20 provides for the upper portion of the flange to be located above the bottom of base 20. This construction insures that the upper surface 63 of window housing 60 is located and forced into inverted valley 24.

Weather sealing strip 10 of the present invention is desirably made by coextruding the two-above noted different types of materials which form seal element 30. The extrusion is then cut to length and notched as required. The low friction surface (flock) and an optional appearance coating can be applied at the extrusion process, or after a rough cut, or the same operations can be conducted separately. The finished extrusion is then placed in an injection mold, the mold closed and the thermoplastic material, usually glass filled polypropylene, is injected into the mold cavity. The melted thermoplastic contacts tabs 31A and recesses 31B of the seal element and fuses thereto as by melting a portion of the seal element and thus forms a good bond therewith after cooling. If desired, end caps and other features can be added during the molding process. The finished weather strip is then removed from the mold.

Weather seal strip 10 can optionally be decorated or rendered aesthetically pleasing by additional intermittent or continuous bright trim elements 81 and 83 as shown in the drawings. Trim element 81 which generally extends along the body of the weather seal can be mechanically attached by generally having a "C"-shape which resides about body tab 37. Optionally, trim tab 83 (FIG. 7) can be applied to lip 32 of seal element 30 and comprise metal trim 83 existing about a rubber or plastic substrate 84. Trim element 83 can be adhered to lip portion 34 as by adhesion, hot melt bonding, or the like.

While in accordance with the Patent Statutes, a preferred embodiment and best mode has been presented, the scope of the invention is not limited thereto, but rather is measured by the scope of the attached claims.

What is claimed is:

1. A weather sealing strip for use in the opening between a vehicle window housing having at least one aperture and a window of the vehicle, the strip, comprising;

a relatively rigid base;

an elastomeric seal element connected to said base and capable of engaging the window in the window opening; and at least one downward fastening means capable of residing within the aperture and being integral along a limited longitudinal distance with said base and having a slot in a longitudinal direction capable of securing said sealing strip to the window housing.

2. A weather sealing strip according to claim 1, wherein said fastening means is a flange and wherein said slot extends transversely through said flange and said base.

3. A weather sealing strip according to claim 1, wherein said fastening means is a laterally offset flange, and wherein said slot is located in the vicinity of the joinder of said flange and said base.

4. A weather sealing strip according to claim 3, wherein said slot laterally extends through said flange.

5. A weather sealing strip according to claim 4, wherein said slot is capable of engaging the edge portion of the aperture.

6. A weather sealing strip according to claim 5, wherein the window housing has a leg, wherein said rigid base is capable of engaging one side of the housing leg, wherein said flange is capable of resiliently engaging the other side of the housing leg, and wherein said flange slot is located above the bottom of said rigid base.

7. A weather sealing strip according to claim 6, wherein said seal element has an upward extending lip capable of engaging the vehicle window and a skirt capable of engaging the window housing.

8. A weather seal strip for sealing the opening between a vehicle window and a vehicle window housing, comprising:

a seal element connected to a relatively rigid base, said base having at a joinder area a downward depending flange, said base having an inverted valley in said joinder area, a longitudinal slot formed by said valley and said flange, said slot extending transversely through said flange.

9. A weather seal strip according to claim 8, wherein said flange is offset from said base.

10. A weather sealing strip according to claim 8, wherein said slot extends a limited longitudinal distance of the flange length.

11. A weather sealing strip according to claim 10, wherein said seal element has an upwardly extending lip capable of engaging the vehicle window.

12. A weather sealing strip according to claim 11, wherein said flange is laterally offset from said base.

13. A weather sealing strip according to claim 11, wherein said seal element is made of at least two different durometer rubbers.

14. A weather sealing strip according to claim 13, wherein said seal lip is made of a low durometer rubber relative to the remaining portion of said seal element.

15. A weather sealing strip according to claim 13, wherein said base is a molded thermoplastic and wherein said seal element is an extruded rubber.

16. A weather sealing strip according to claim 8, wherein said base is a molded thermoplastic and wherein said seal element is an extruded rubber.

* * * * *